(12) United States Patent
Liu

(10) Patent No.: US 6,674,568 B2
(45) Date of Patent: Jan. 6, 2004

(54) METHOD AND APPARATUS FOR ACHIEVING FLAT BROADBAND RAMAN GAIN

(75) Inventor: Xiang Liu, Eatontown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/095,021

(22) Filed: Mar. 11, 2002

(65) Prior Publication Data

US 2003/0169479 A1 Sep. 11, 2003

(51) Int. Cl.$^7$ ................................................. H01S 3/00
(52) U.S. Cl. ...................... 359/334; 359/337.1
(58) Field of Search ............................. 359/334, 337.1, 359/337.11

(56) References Cited

U.S. PATENT DOCUMENTS 6,292,288 B1 * 9/2001 Akasaka et al. ............ 359/334
2002/0054733 A1 * 5/2002 Kagi et al. .................... 385/27

FOREIGN PATENT DOCUMENTS

JP          020002258336 A  *  9/2002

* cited by examiner

Primary Examiner—Mark Hellner

(57) ABSTRACT

A method and apparatus for receiving a gain profile from optical channel monitors (OMONs) and using that gain profile along with additional system parameters received from the OMONs for calculating the needed Raman pump parameters (power and/or wavelength) and adjusting the Raman pumps to those calculated parameters for achieving any pre-determined broadband signal gain or power profile. The calculated Raman pump parameters are scaled to be within a range of predetermined acceptable values.

24 Claims, 12 Drawing Sheets

METHOD AND APPARATUS FOR ACHIEVING FLAT BROADBAND RAMAN GAIN

FIELD OF THE INVENTION

This invention relates to the field of optical communications and, more specifically, to Raman-pumped WDM systems.

BACKGROUND OF THE INVENTION

The demand for communication systems with higher capacities has pushed the common design approaches of wavelength-division-multiplexed (WDM) systems to their limits. A typical configuration of a point-to-point WDM system includes a number of optical transmitters, an optical multiplexer, spans of transmission fiber, optical amplifiers (usually erbium-doped fiber amplifiers, EDFAs), dispersion compensating devices, an optical demultiplexer and a number of optical receivers. Unfortunately, the usable gain bandwidth for the optical amplifiers currently used, for example the EDFAs, is limited and not very broad, and the distortion of the signal does not allow for transmission over very long optical transmission links. This has led to the investigation of alternate methods for amplification with greater broadband capabilities that allow for longer spacing in-between amplification and longer transmission distances.

The use of Raman amplification has been proposed and demonstrated for compensating losses in all-optical transmission systems. Raman amplification is achieved by launching high-power pump waves into a silica fiber at a wavelength lower than the signal to be amplified. Amplification occurs when the pump wavelength gives up its energy to create new photons at the signal wavelength. Since there is a wide range of vibrational states above the ground state, a broad range of transitions may provide gain, of which, typically, 48 nm is usable gain. Raman gain increases almost linearly within the wavelength offset between the pump wavelength and the signal wavelength, peaking at a distance of typically 100 nm and then dropping off rapidly with increased offset. Ultra-broad Raman gain bandwidth can be achieved by combining the Raman amplification effect of multiple pump waves selected carefully for the wavelength domain. See, for example, H. Kidorf, K. Rottwitt, M. Nissov, M. Ma, and E. Rabarijaona, "Pump interactions in a 100-nm bandwidth Raman amplifier," IEEE Photonics Tech. Lett. 11, 530, 1999. Additionally, the positions of the gain bandwidth within the wavelength domain of each pump can be adjusted by tuning the pump wavelength. Compared to commonly used erbium-doped fiber amplifiers (EDFAs), Raman amplifiers exhibit several fundamental advantages such as low noise, fixed gain profiles which are independent of signal and pump levels; they are also operable in a plurality of signal bands since Raman gain peak changes with pump wavelength. Despite all of its advantages, there are some degradation effects related to Raman-pumped WDM systems. For example, in addition to the desired pump-to-signal power transfer, there also exist pump-to-pump and signal-to-signal power transfers. The latter two power transfers introduce gain tilting in such a way that signals at longer wavelengths experience stronger gain than those at shorter wavelengths. This effect leads to non-uniform gain and thus the non-uniform nonlinear penalty and noise level across the signal wavelengths. Additionally, power fluctuations in time within the Raman pump wave, which is so often the case, may lead to amplified fluctuations or jitter, which also degrades system performance.

SUMMARY OF THE INVENTION

The invention comprises a method and apparatus for achieving flat, broadband Raman gain within a Raman-pumped WDM system by adapting at least one Raman pump in response to differences between a desired gain profile and a determined gain profile.

In another embodiment of the invention, a method for achieving flat broadband Raman gain includes the steps of determining a signal gain profile of a Raman-pumped WDM system and adapting the pump wavelength and/or powers of the Raman-pumped WDM system to modify the signal gain or power profile in a manner approaching a flat or any pre-determined broadband Raman gain or power profile.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be described within the context of an all-Raman-pumped WDM system. However, it will be appreciated by those skilled in the art that the subject invention may be advantageously employed in any system utilizing at least one Raman pump. The subject invention may also be advantageously employed in a hybrid systems comprising at least one Raman pump as well as non-Raman optical pumps or sources.

Figure 1:
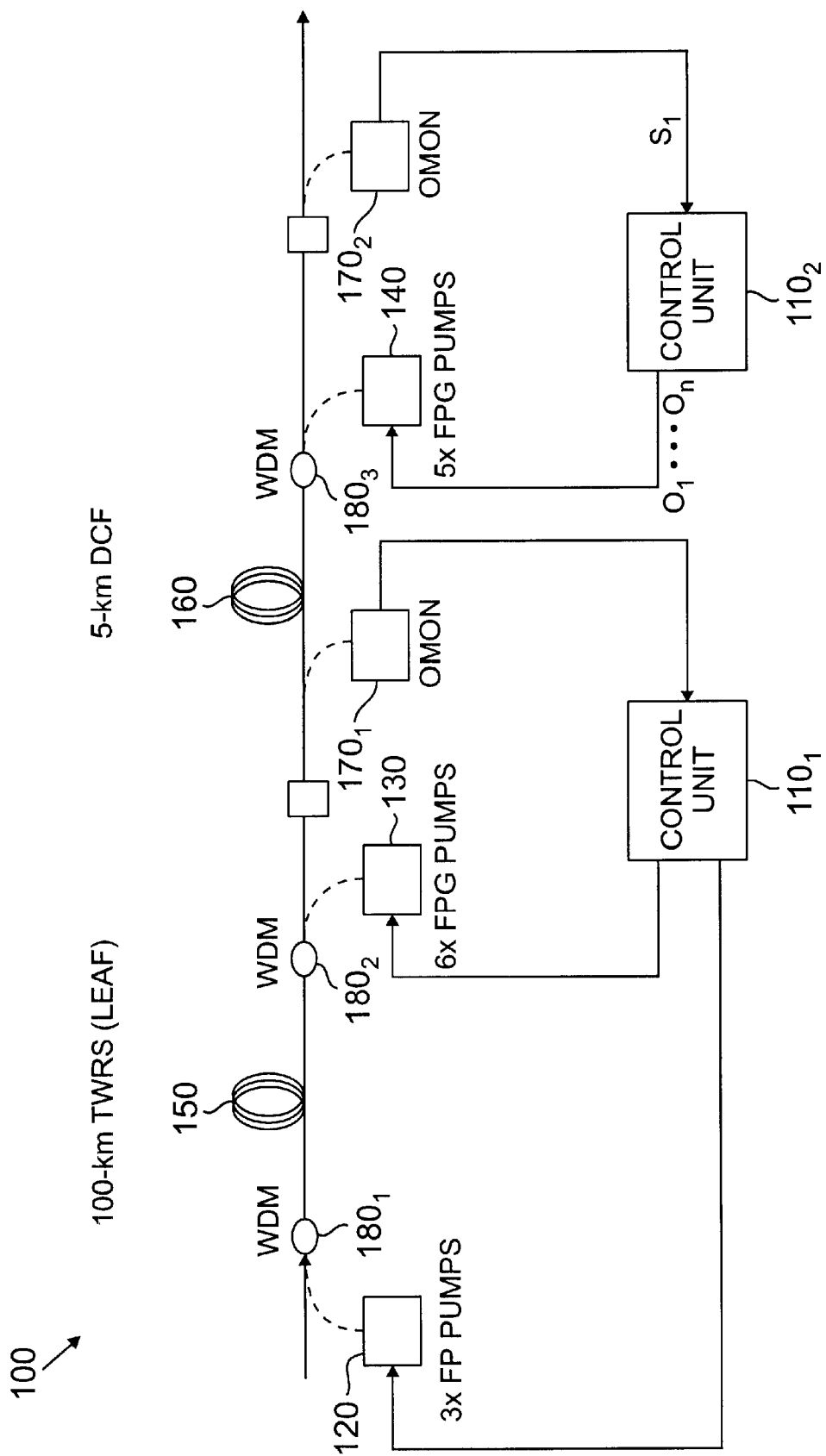
FIG. 1 depicts an embodiment of a span for an all-Raman-pumped WDM system.

FIG. 1 depicts an embodiment of a span in an all-Raman-pumped wavelength-division-multiplexed (WDM) system 100. The WDM system 100 of FIG. 1 provides amplification of optical signals in two sections, namely a 100-km TWRS 150, and a dispersion-compensating fiber (DCF) 160. Gain profiles of the amplified optical signals are measured by optical channel monitors, subsequent to the two sections, and are used to calculate parameters needed to achieve broadband Raman gain flattening. Briefly stated, optical signals enter the WDM system 100. The signals are then amplified in the 100-km TWRS 150 and the gain profile subsequently measured by a first optical channel monitor (OMON) $170_1$. The optical signals then proceed to the DCF 160 where they are again amplified and the gain profile again subsequently measured by a second OMON $170_2$. The optical signals then proceed on through the WDM system 100.

The system 100 of FIG. 1 includes two control units $110_1$ and $110_2$, a set of forward Raman pumps 120 (illustratively three), a first set of backward Raman pumps 130 (illustratively six), a second set of backward Raman pumps 140 (illustratively five), a TWRS 150 (illustratively 100-km), a dispersion-compensating fiber (DCF) 160 (illustratively 5-km), two optical channel monitors (OMONs) $170_1$ and $170_2$, and three wavelength-division-multiplexers (WDMs) $180_1$, $180_2$, and $180_3$ for coupling the Raman pump waves into the system 100.

As can be seen from FIG. 1, all entering optical signals pass through the 100-km TWRS 150, where they are amplified by the three forward Raman pumps 120 and the six backward Raman pumps 130. The Raman pump waves of the Raman pump sets 120 and 130 are coupled into the 100-km TWRS by the WDMs $180_1$ and $180_2$. The six backward Raman pumps 130 are divided into two groups, each of three equally frequency-spaced pumps. The first set of backward Raman pumps 130 are implemented to reduce WDM loss in the span due to noise nonlinearity caused by power fluctuations in the pumps. After the optical signal is amplified, a first gain profile is determined by the first OMON $170_1$. The optical signals then proceed to the, illustratively, 5-km DCF 160. In the DCF 160, the second set of backward Raman pumps 140 amplify the optical signals again. The second set of backward Raman pumps 140 include a group in which three of the five pumps used are equally spaced in frequency. All of the five backward Raman pumps used in this second set 140 are used for pumping the dispersion-compensating fiber (DCF) 160. The Raman pump waves of the five backward Raman pumps 140 are coupled into the 100-km TWRS by the WDM $180_3$. After the optical signal is amplified, a second gain profile is determined by the second OMON $170_2$. The optical signals then continue through the span of the system 100.

The determinations provided by the OMONs $170_1$ and $170_2$ are transmitted back to the control units $110_1$ and $110_2$, respectively. (In another embodiment, the measurements from both of the OMONs $170_1$ and $170_2$ are sent to a two-channel control unit). These determinations include data reflecting signal powers, pump wavelengths, and other system parameters. The control units $110_1$ and $110_2$ process the information from the OMONs $170_1$ and $170_2$ and calculate the appropriate Raman pump parameters for gain flattening across the system. These parameters may include Raman pump power and/or Raman pump wavelength, calculated by using an algorithm according to this invention that will be discussed in more detail below. Briefly, the control units $110_1$ and $110_2$ utilize gain spectrum data provided by the OMONs $170_1$ and $170_2$ respectively to responsively adjust the pump parameters of all the Raman pumps 120, 130, and 140 in a manner tending to produce a relatively flat gain profile (or other desired gain profile). The control function of the exemplary embodiment includes a negative feedback loop that automatically adjusts Raman pump powers and/or wavelengths based on signal gain profile. In the DCF, the output signal profile is used as the input to the DCF and gain flattening is performed according to the output signal profile from the DCF.

In cases where pump wavelengths drift, negatively affecting the gain flatness, the control loop optionally uses information regarding the actual wavelengths of the pumps from the OMONs $170_1$ and $170_2$ and adjust one or both of the pump wavelength and the pump power to achieve a flat broadband Raman gain.

Figure 2:
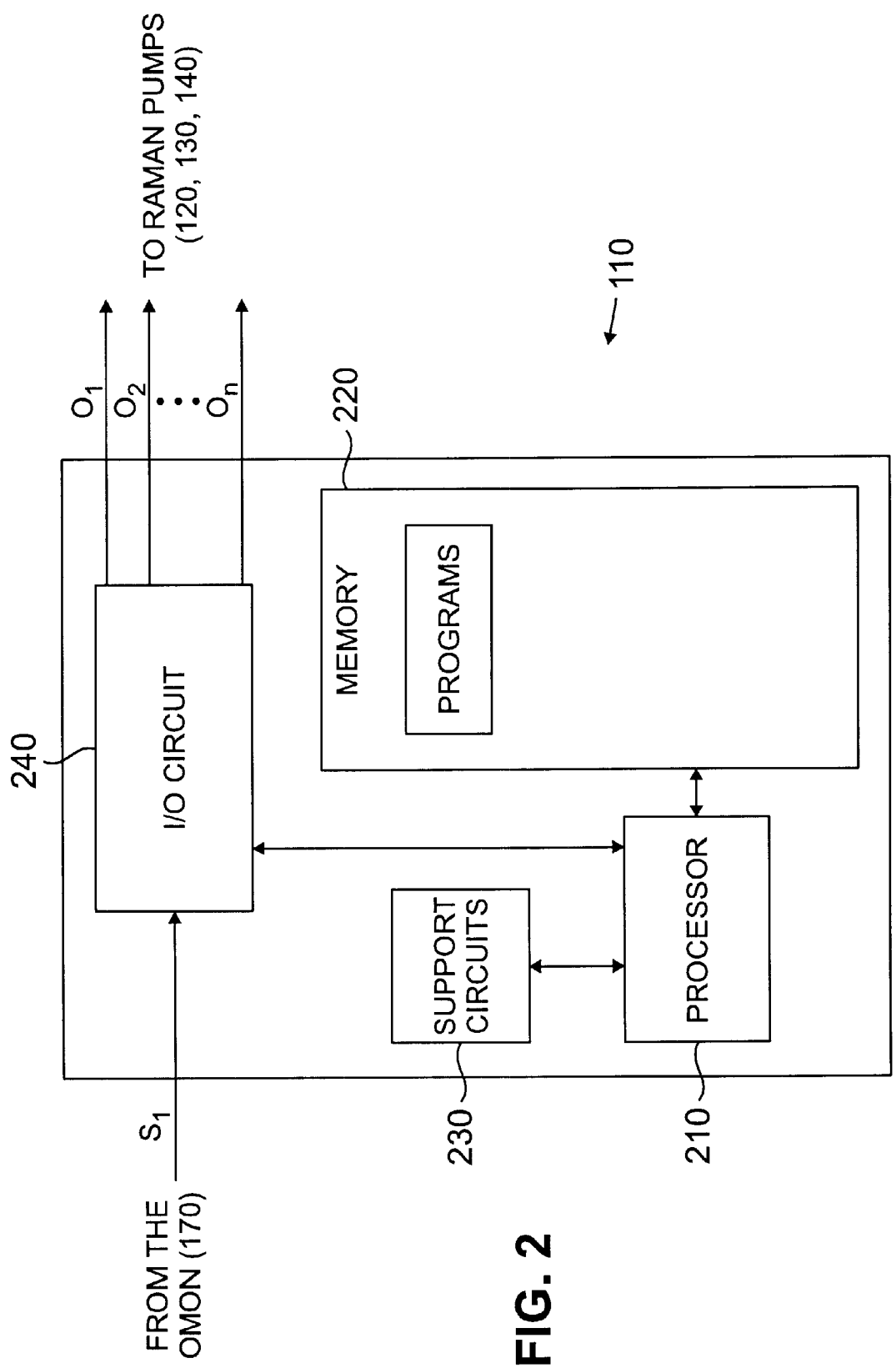
FIG. 2 depicts a high-level block diagram of a control unit suitable for use in the system of FIG. 1.

FIG. 2 depicts a high-level block diagram of one embodiment of a control unit suitable for use in the all-Raman-pumped WDM system 100 of FIG. 1. The control unit 110 of FIG. 2 comprises a processor 210 as well as a memory 220 for storing the algorithms and control programs. The processor 210 cooperates with conventional support circuitry 230 such as power supplies, clock circuits, cache memory and the like as well as circuits that assist in executing the software routines stored in the memory 220. As such, it is contemplated that some of the process steps discussed herein as software processes may be implemented within hardware, for example, as circuitry that cooperates with the processor 210 to perform various steps. The control unit 110 also contains input-output circuitry 240 that forms an interface between the various functional elements communicating with the control unit 110. For example, in the embodiment of FIG. 1, the control unit 110 communicates with one of the OMON 170 via a signal path S1 and to each of a plurality of Raman pumps via signal paths O1-On.

Although the control unit 110 of FIG. 2 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

Figure 3:
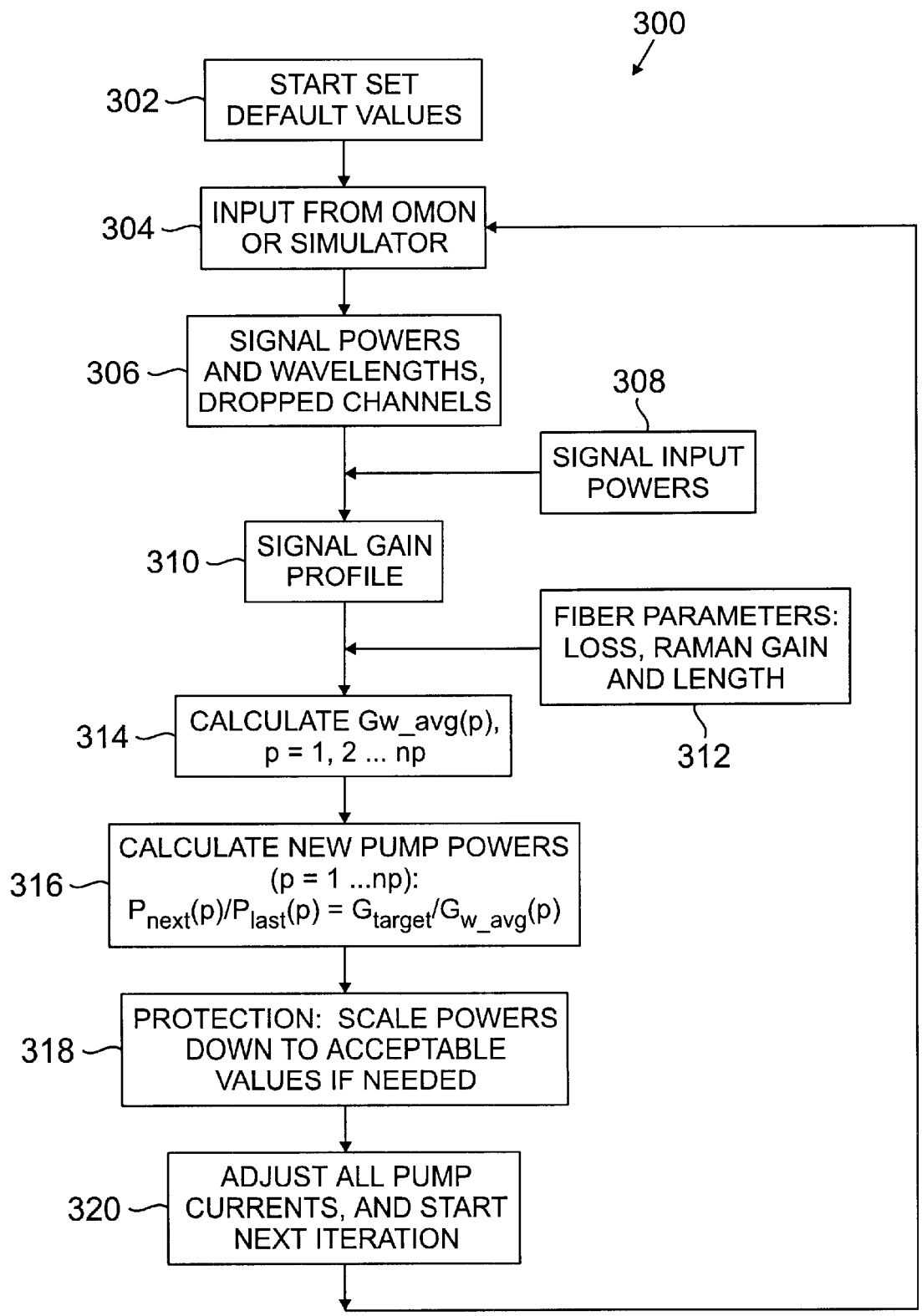
FIG. 3 depicts a flow diagram of a method for achieving flat broadband Raman gain.

FIG. 3 depicts a flow diagram of one embodiment of a method 300 for achieving flat broadband Raman gain in a Raman pumped WDM system. The method 300 uses the gain spectrum measured by the OMONs to dynamically control the pump powers to achieve and maintain the flatness (or other intended gain profile) of the gain spectrum. Although the method 300 will be described within the context of dynamically controlling only the Raman pump powers, it will be appreciated by those skilled in the art that the subject invention may be advantageously employed in methods where the Raman pump powers and/or Raman pump wavelengths can be dynamically controlled simultaneously.

The method 300 is entered at step 302, where a Raman pumped WDM system such as the system 100 of FIG. 1 is initially started using default or start values. Specific start values for pump powers and pump wavelengths are chosen in an attempt to maximize the gain in the system, while still maintaining low noise and flat gain. Methods for determining default or start values are well-known to those skilled in the art and will not be described in detail.

At step 304, the method 300 waits for an input. That is, at step 304 the control unit 110 executing the method 300 waits for data from the OMON 170 or a simulator (not shown). As depicted in steps 306, 308, 310, and 312, the data to the control unit 110 includes: signal powers, wavelengths and dropped channels (306); signal input powers (308); a signal gain profile (310) and fiber parameters including: loss, Raman gain, and length (312).

At step 314, the control unit 110 calculates the average gains of the Raman pumps, $G_{w\_avg}(p)$, also considered the contribution of pump (p) on the gain profile, using an algorithm stored in the control unit 110. An exemplary method for performing step 314 will be described below with respect to Equation 2.

At step 316, the new needed Raman pump powers are calculated using the calculated average gains of the Raman pumps, $G_{w\_avg}(p)$, and the algorithm stored in the memory 220 of the control unit 110. An exemplary method for performing step 316 will be described below with respect to Equation 4.

At step 318, the method 300 scales the new calculated Raman pump powers down to acceptable values if needed. That is, if the values calculated are not within an allowable predetermined range stored within the memory 220 of the control unit 110, the new calculated Raman pump powers are scaled down to be within the predetermined range.

At step 320, the Raman pump currents are adjusted as necessary to correspond to the new calculated values. The method 300 then proceeds to step 304 to perform the next iteration.

The above-described method 300 of FIG. 3 provides a general methodology according to the subject invention. As previously noted, although the method 300 of FIG. 3 is described within the context of dynamically controlling only the Raman pump powers, it will be appreciated by those skilled in the art that the subject invention may be advantageously employed in methods where the Raman pump powers and/or Raman pump wavelengths can be dynamically controlled.

In one embodiment according to the principles of the present invention, pump power distribution can be optimized to minimize gain tilting and peak-to-peak ripple so as to achieve and maintain a flat broadband Raman gain profile. The optimization is accomplished taking an inverse approach. Initially, the signal gain profile is obtained using the start values, and the data is sent to the control unit. The desired pump power levels are calculated using the algorithm in the control unit and the pump power is adjusted to achieve a flat broadband Raman gain profile. Since pump-to-signal interaction is the primary interaction, the relationship between gain profile and pump distribution is considered first.

The pump-to-signal power transfer can be written according to the equation (1), as follows:

$$G(v_s) = \sum_{p=1}^{np} \int_{z=0}^{L} R(v_p \rightarrow v_s) P_p(z) dz = \sum_{p=1}^{np} R(v_p \rightarrow v_s) \overline{P_p} L, \quad (1)$$

In equation (1), the term $G(v_s)$ is the gain experienced by signal at frequency $v_s$ in dB; and $R(v_p \rightarrow v_s)$ is the Raman gain coefficient in dB/km/W (which depends on the values of frequency $v_p$ and $v_s$, fiber type and effective area). It should be noted that fiber effective area is also dependent on wavelength. $P_p(z)$ and P bar are the power at distance z and the path-averaged power at pump channel $v_p$, respectively. The total number of pumps is np. Using Equation (1), flat gain profile can be achieved by either optimizing pump power or optimizing pump wavelength or both.

In one embodiment of an algorithm according to the present invention, a flat gain profile is achieved by adjusting pump powers while maintaining pump wavelengths fixed. The optimization of pump power distribution using fixed wavelengths can be calculated with Equation (2), as shown below. To consider the contribution of pump $v_{p1}$ on the gain profile, the gain profile is integrated with a weighting function, $R((v_{p'} \rightarrow v_s)$:

$$G_{w\_avg}(p') = \frac{\int_{v_{s\_min}}^{v_{s\_max}} G(v_s) R(v_{p'} \rightarrow v_s) dv_s}{\int_{v_{s\_min}}^{v_{s\_max}} R(v_{p'} \rightarrow v_s) dv_s} = \frac{\sum_{p=1}^{np} \left[ \overline{P_p} L \cdot \int_{v_{s\_min}}^{v_{s\_max}} R(v_{p'} \rightarrow v_s) R(v_p \rightarrow v_s) dv_s \right]}{\int_{v_{s\_min}}^{v_{s\_max}} R(v_{p'} \rightarrow v_s) dv_s}. \quad (2)$$

Raman gain profile from a single pump in silica fiber exhibits a peak at frequency ~13 THz lower than the pump frequency. The integration on the right side of Equation (2) is maximum when p equals p', so the most significant contribution to the summation is usually from a pump at $v_{p'}$ as shown in equation (3), as follows:

$$\max\left[\int_{v_{s\_min}}^{v_{s\_max}} R(v_{p'} \rightarrow v_s) R(v_p \rightarrow v_s) dv_s \right] \approx \overline{P_{p'}} L \cdot \int_{v_{s\_min}}^{v_{s\_max}} R(v_{p'} \rightarrow v_s)^2 dv_s \propto \overline{P_{p'}}. \quad (3)$$

The value of the integration of $G_{w\_avg}(p')$ is directly related to the path-averaged power of pump $v_{p'}$. If the value is larger than the averaged value for all the pumps, then the input power of pump $v_{p'}$ needs to be reduced, and vice versa. By adjusting the power of each pump based on their $G_{w\_avg}$ values, the gain spectrum can be flattened or otherwise adapted to a desired shape. To achieve targeted average gain, the pump powers are scaled by the ratio of targeted on-off Raman gain to the obtained average gain:

$$P_{next}(p)/P_{last}(p) = G_{target}/G_{w\_avg}(p), \, p=1, 2 \ldots np. \quad (4)$$

The flatness of the gain can be characterized by the following two parameters; root-mean-square (RMS) gain variation and peak-to-peak (p-p) gain ripple to provide equation (5), as follows:

$$\Delta G_{RMS} = \sqrt{\left[\sum_{s=1}^{ns} (G(s) - \overline{G})^2 \right]/ns}, \quad (5)$$

$$\Delta G_{p-p} = \max[G(s), s = 1 \ldots ns] - \min[G(s), s = 1 \ldots ns].$$

Figure 4A:
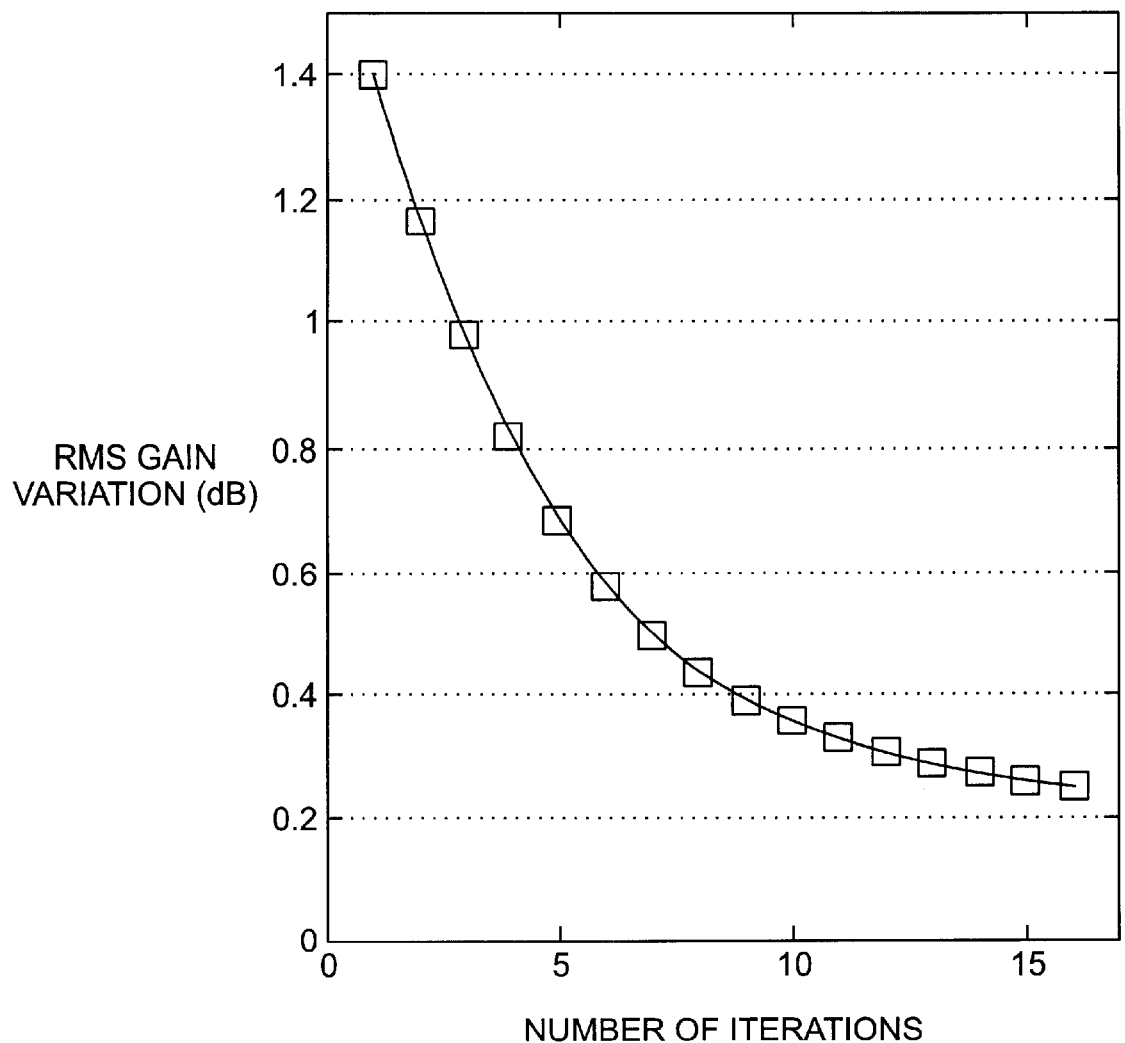
FIG. 4 graphically depicts the reduction of Raman gain variations after 16 iterations of the method of FIG. 3 based on adjusting only pump powers.
Figure 4B:
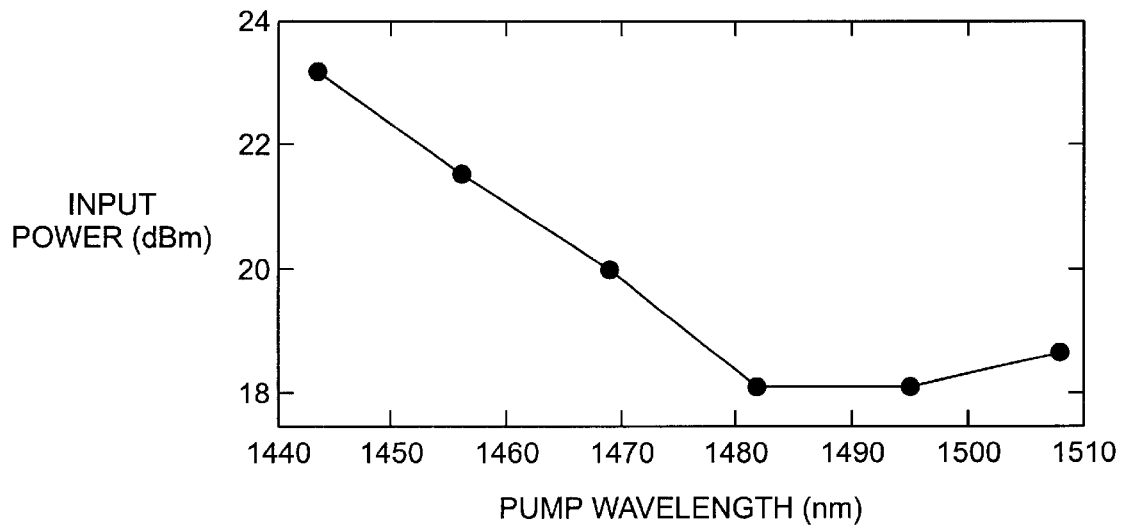
Figure 4C:
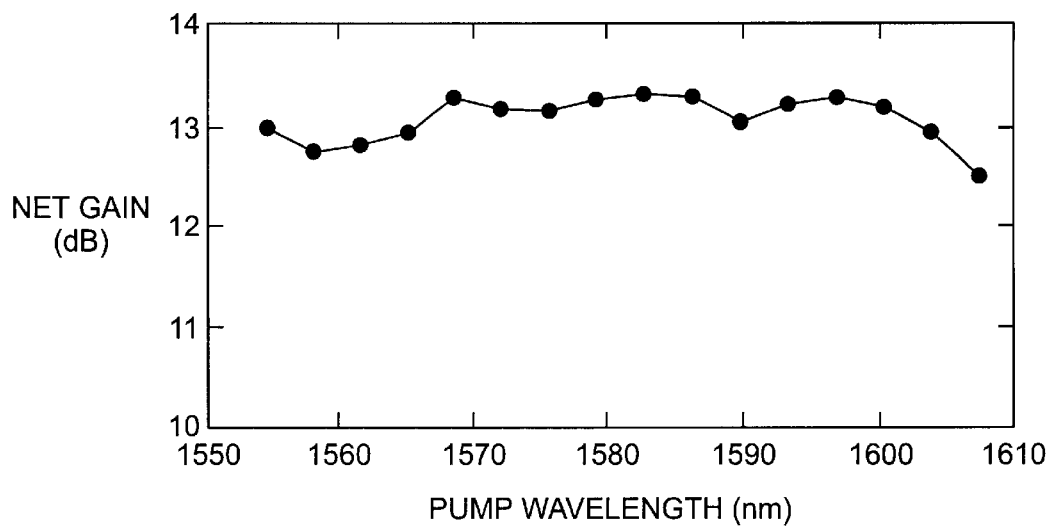

FIG. 4 depicts the reduction of RMS gain variation with a number of iterations in a system using the above algorithm for adjusting only Raman pump powers. After 16 iterations, it can be seen in FIG. 4a that the RMS gain variation is reduced from 1.4 dB to 0.24 dB. FIG. 4 also shows the input pump distribution and signal gain spectrum obtained after 16 iterations. From the data presented, it is clear that optimization takes place quite fast.

In another embodiment of the algorithm of the present invention, flat gain profile can be achieved by adjusting pump wavelengths while maintaining pump powers fixed.

The spacing between two adjacent pump wavelengths may need to be widened or narrowed if the signal gain averaged over the range between the two Raman peaks is larger or smaller than the mean gain averaged over the entire signal band. Equation (6) is used to calculate the average gain between pump $v_p$ and $v_{p+1}$:

$$G_{avg}(p \to p+1) = \int_{v_p - \Delta v_R}^{v_{p+1} - \Delta_R} G(v_s) dv_s / (v_{p+1} - v_p) \qquad (6)$$

$$\approx \left[ \overline{P_p} L \cdot \int_{v_p - \Delta_R}^{v_{p+1} - \Delta_R} R(v_p \to v_s) dv_s + \overline{P_{p+1}} \int_{v - \Delta_R}^{v_{p+1} - \Delta_R} R(v_{p+1} \to v_s) dv_s \right] / (v_{p+1} - v_p)$$

$$\approx \frac{\overline{P_p} + \overline{P_{p+1}}}{2} \cdot L \cdot \int_{v_p - \Delta_R}^{v_{p+1} - \Delta_R} (R(v_p \to v_s) + R(v_{p+1} \to v_s) dv_s / (v_{p+1} - v_p).$$

For purposes of the calculation, it is assumed that the signal gain is contributed mostly by the two pumps whose Raman peaks are the closest to the signal in the first approximation, and that the pump powers of any two adjacent pumps are similar in the second approximation. The frequency shift from the pump to its Raman gain peak is $\Delta v_R$ (~13 THz in silica fiber). Furthermore, it is approximated that the Raman gain due to a signal pump follows a Gaussian profile with a FWHM bandwidth of $\Delta v_g$ (~3 THz), then Equation (6) can be rewritten as equation (7) as follows:

$$G_{avg}(p \to p+1) \approx \frac{\overline{P_p} + \overline{P_{p+1}}}{2} \cdot L \int_0^{v_{p+1} - v_p} R_{peak} \left( e^{-\ln 2 \left( \frac{v}{\Delta v_g} \right)^2} + e^{-\ln 2 \left( \frac{v_{p+1} - v_p - v}{\Delta v_g} \right)^2} \right) dv / (v_{p+1} - v_p) \qquad (7)$$

$$\approx \frac{\overline{P_p} + \overline{P_{p+1}}}{2} \cdot L \cdot R_{peak} \left[ 1 - \frac{2}{3} \frac{(v_{p+1} - v_p)^2}{\Delta v_g^2} \right].$$

The signal gain averaged between the resulting two adjacent Raman peaks can be increased or decreased by widening or narrowing the pump spacing ($v_{p+1} - v_p$). Thus a negative feedback loop can be created to adjust the spacing between any two adjacent pumps based on the obtained gain spectrum, as shown in equation (8) as follows:

$$\Delta v_{next}(p \to p+1) = c \cdot \Delta v_{last}(p \to p+1) \cdot \frac{G_{avg}(p \to p+1)}{G_{target}}, \qquad (8)$$

$$p = 1, 2 \ldots np - 1,$$

where c is a normalizing factor that keeps the total width of the pump band at the initial value.

Figure 5A:
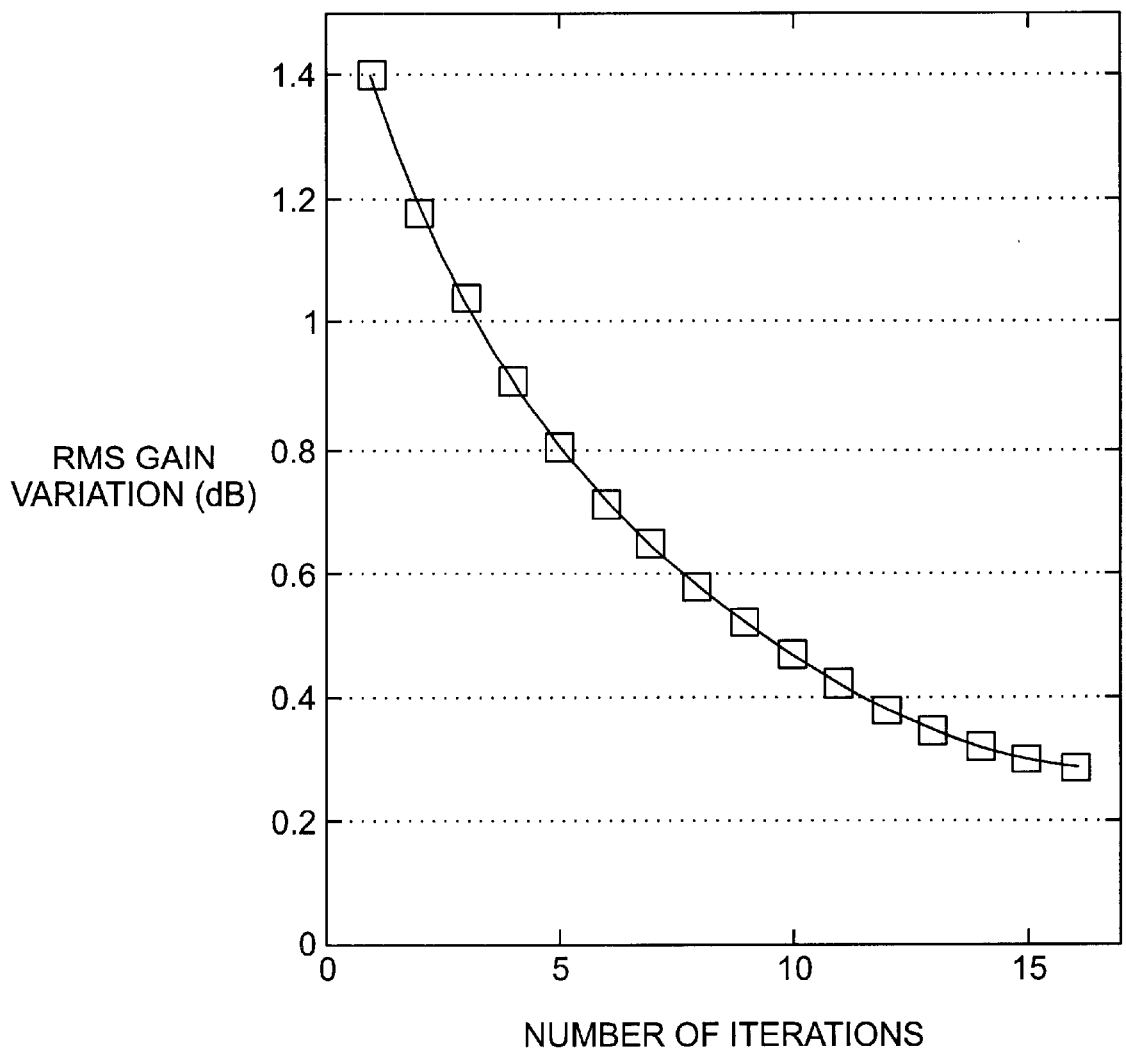
FIG. 5 graphically depicts the reduction of Raman gain variations after 16 iterations of the method of FIG. 3 based on adjusting only pump wavelengths.
Figure 5B:
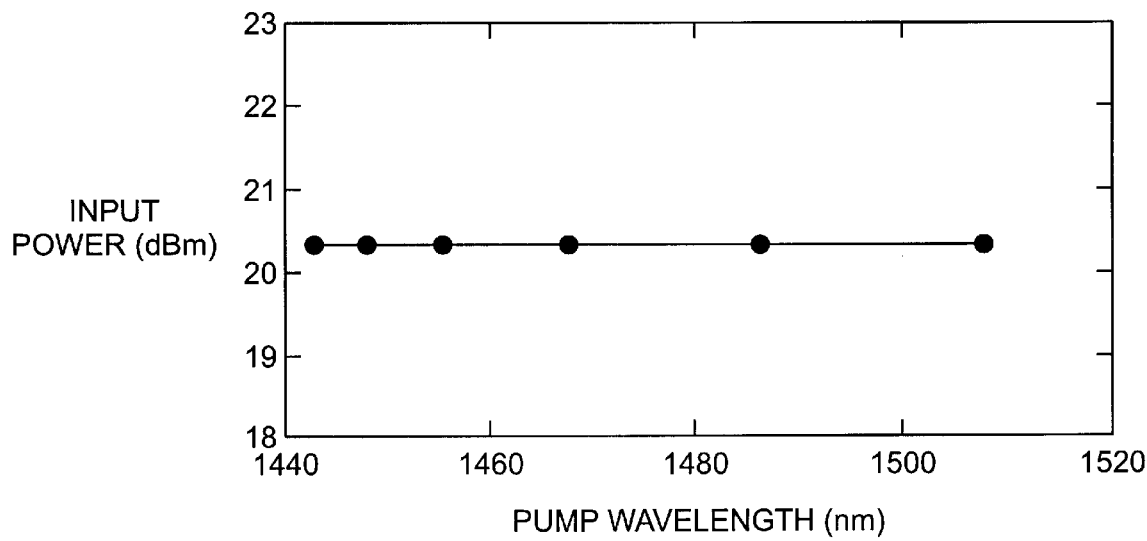
Figure 5C:
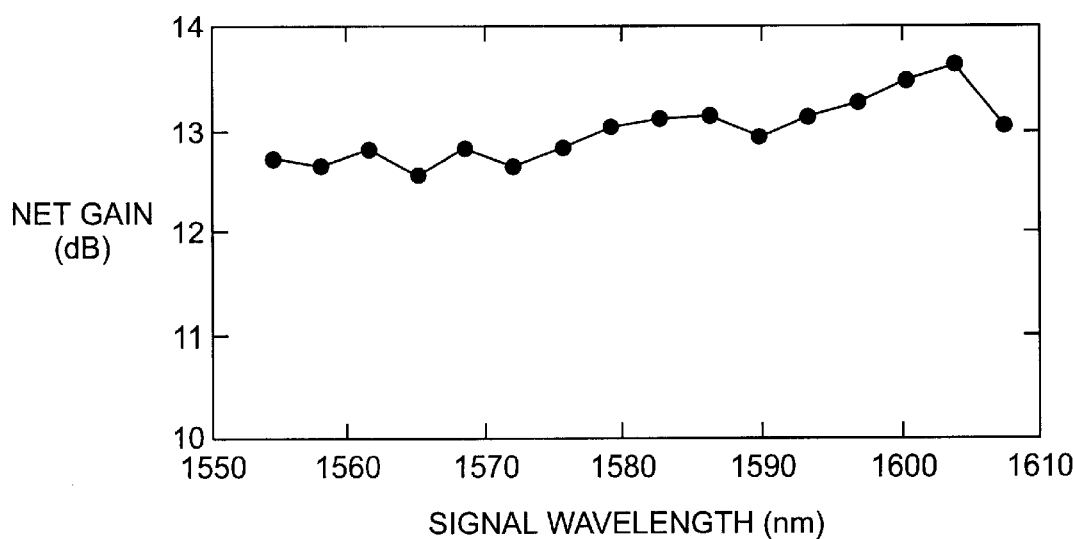

FIG. 5 depicts the reduction of RMS gain variation by optimizing pump wavelengths with uniform pump powers. After 16 iterations, the RMS gain variation is reduced to 0.28 dB. FIG. 5 also shows the input pump distribution and signal gain spectrum obtained after 16 iterations.

Figure 6A:
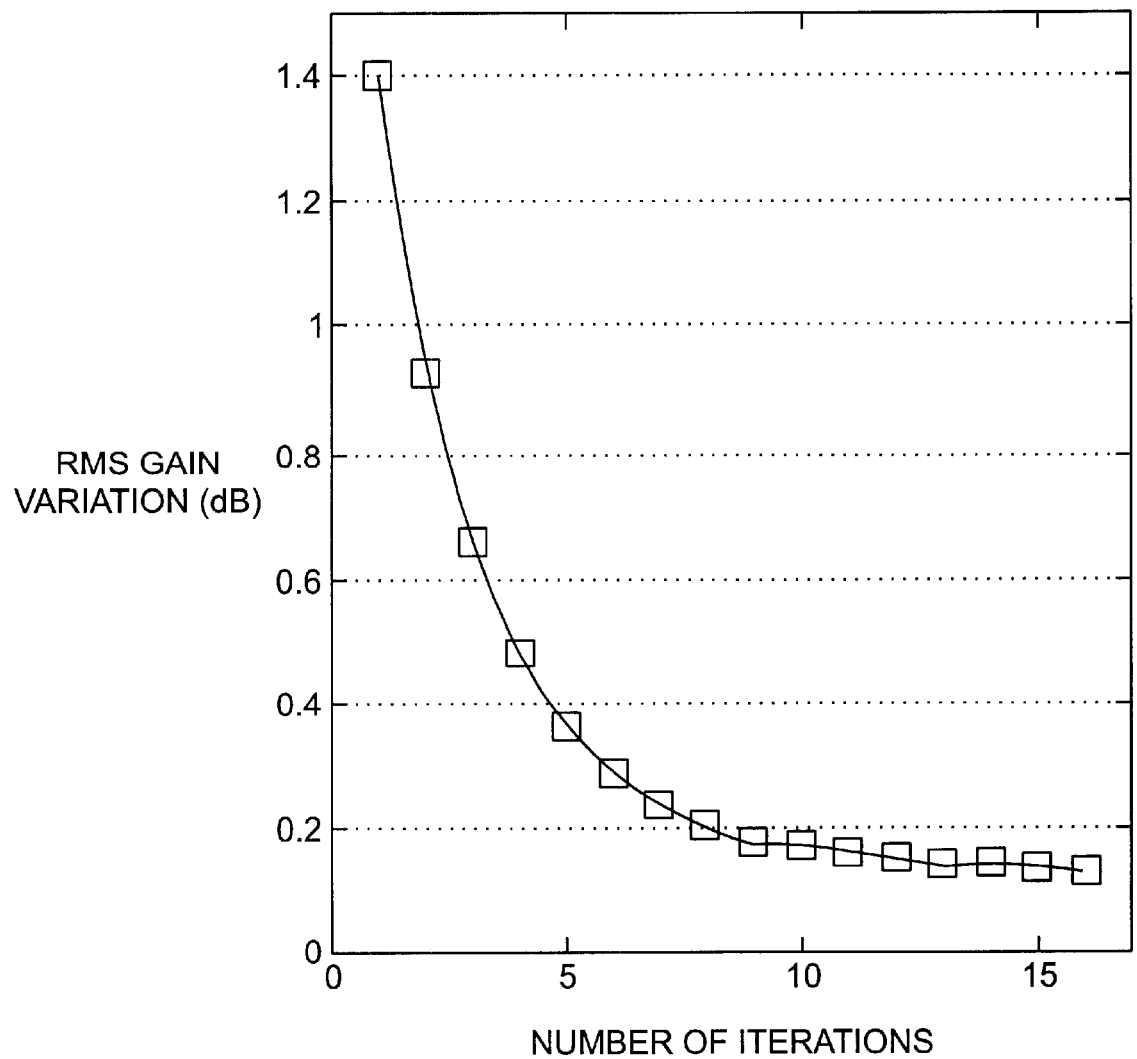
FIG. 6 graphically depicts the reduction of Raman gain variations after 16 iterations of the method of FIG. 3 based on adjusting both pump power and pump wavelengths.
Figure 6B:
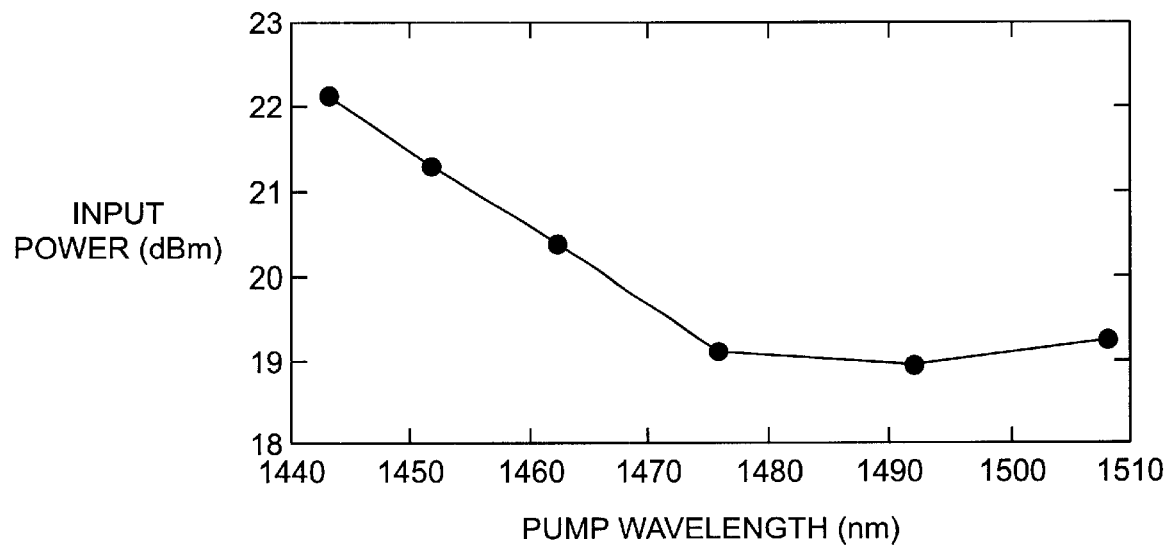
Figure 6C:
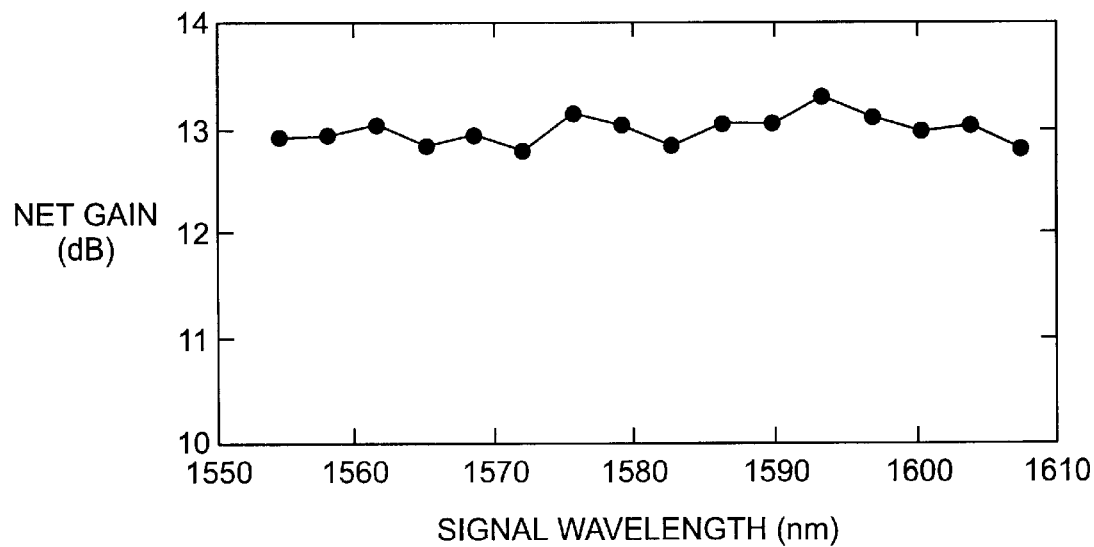

In yet another embodiment of the algorithm of the present invention, flat gain profile can be achieved by adjusting both pump powers and pump wavelengths. Equation (4) for pump power adjustment and Equation (8) for pump wavelength adjustment can be combined in the feedback loop. With both pump power and pump wavelength control, RMS gain variation can be reduced substantially. FIG. 6 depicts the reduction of RMS gain variation by optimizing both pump powers and pump wavelengths. After 16 iterations, the RMS gain variation is reduced to 0.11 dB and p-p gain ripple is reduced to 0.4 dB. FIG. 6 also shows the input pump distribution and signal gain spectrum obtained after 16 iterations.

In another embodiment of the invention, the algorithm of the present invention can be used to correct for the effect that adding and/or dropping signal channels in a communication system has on gain flattening. The parameters for achieving flat broadband Raman gain can change when adding or dropping signal channels in a communication system due to signal-to-signal interaction. As before, the control unit algorithm processes the gain spectrum measured by the OMONs and adjusts pump powers and/or pump wavelengths accordingly. The control algorithm never assumes a certain type of signal distribution and is applicable to any arbitrarily spaced signals. The OMONs are required to detect the added or dropped channels and inform the control unit. The only modification in the algorithm is that the dropped channels will not be counted in computing the weight-averaged gain for each pump.

Figure 7A:
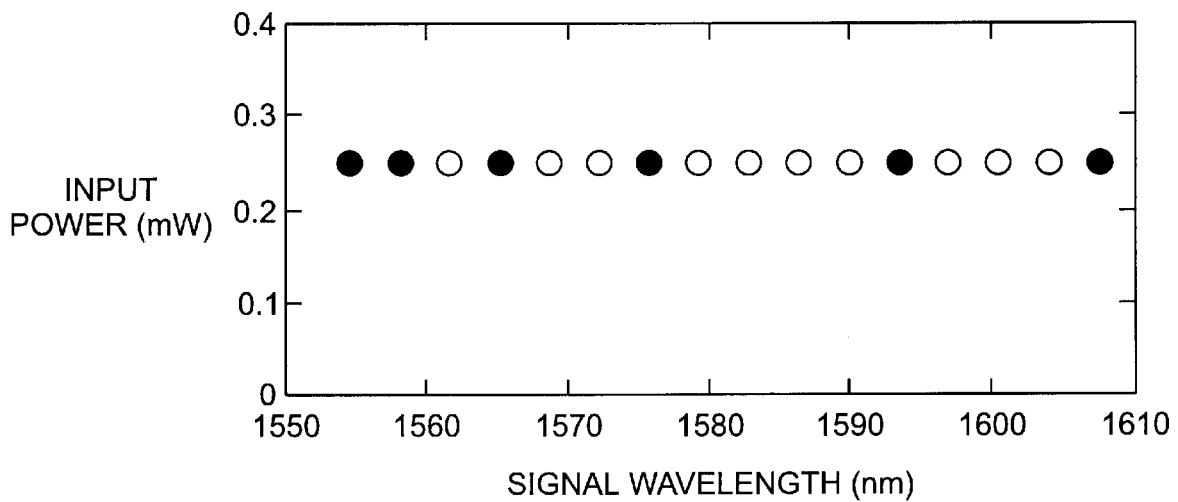
FIG. 7a graphically depicts the signal distribution after some channels are dropped randomly.
Figure 7B:
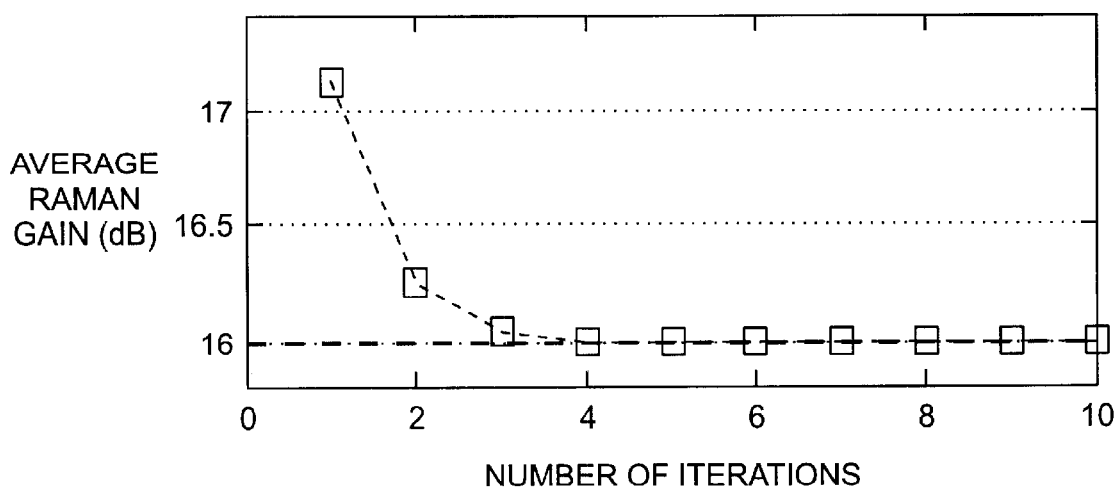
FIG. 7b graphically depicts the recovery of average signal gain with iterations of the method of FIG. 3 after the random channel droppings.
Figure 7C:
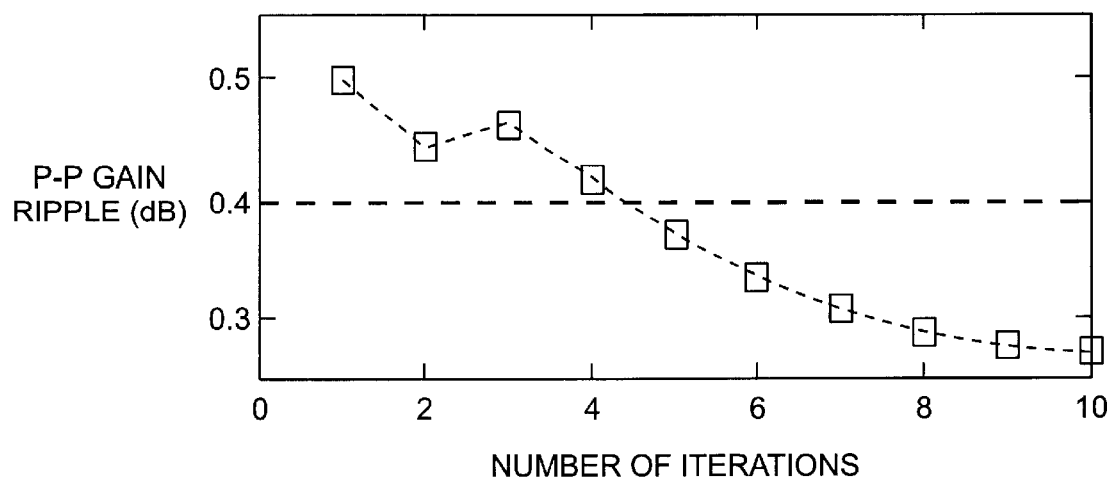
FIG. 7c graphically depicts the reduction of peak-to-peak gain ripple with iterations of the method of FIG. 3 after the random channel droppings.

Examples of the effect that dropping channels has on gain flatness are depicted in FIG. 7 and FIG. 8. FIG. 7a depicts the distribution after some channels are dropped randomly. Upon the dropping, the average gain of the existing channels jumps from the target value of 16 dB to 17.1 dB and the p-p gain variation jumps from 0.4 dB to 0.5 dB. The increase in average gain is due to small pump depletion due to fewer signal channels. Implementing the control algorithm, the gain variation is significantly reduced after only a few iterations, as depicted in FIG. 7b. The p-p gain variation is even further reduced to 0.27 dB after 10 iterations, as depicted in FIG. 7c.

Figure 8A:
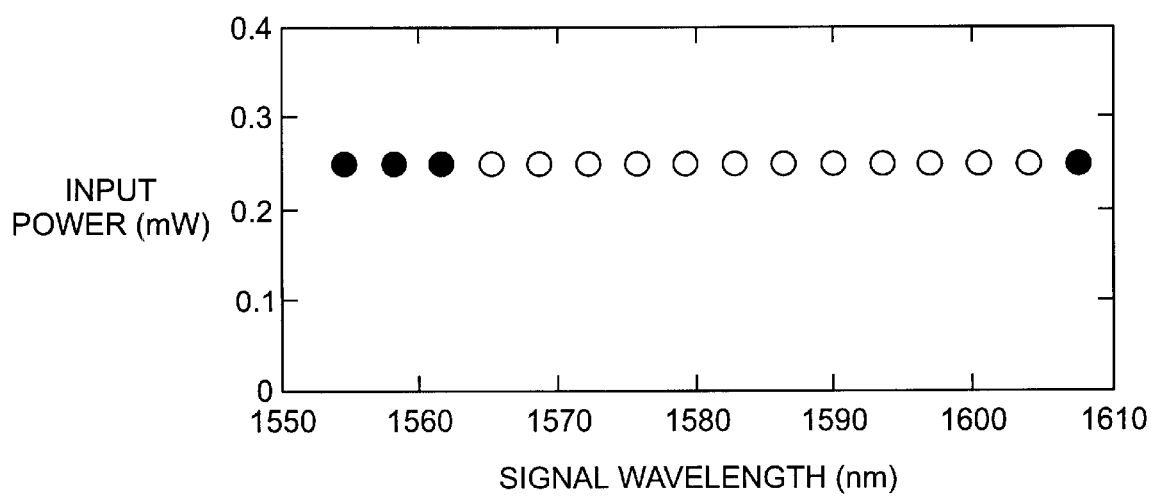
FIG. 8a graphically depicts the signal distribution after several adjacent channels are dropped.
Figure 8B:
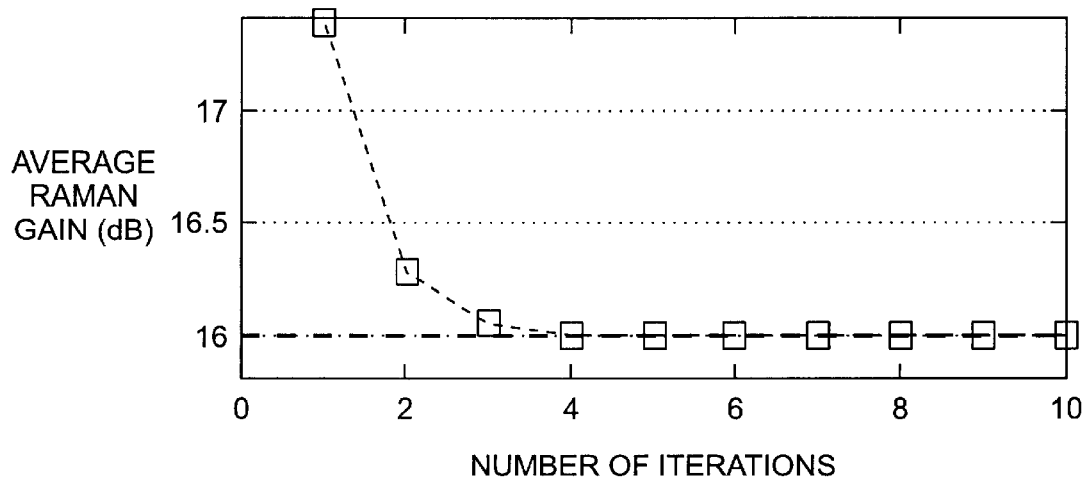
FIG. 8b graphically depicts the recovery of average signal gain with iterations of the method of FIG. 3 after the several adjacent channel droppings.
Figure 8C:
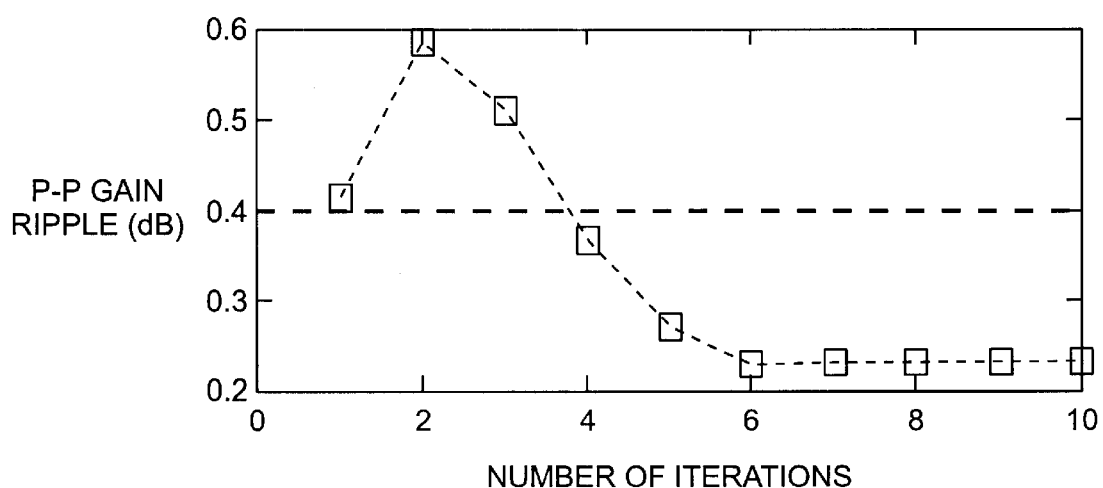
FIG. 8c graphically depicts the reduction of peak-to-peak gain ripple with iterations of the method of FIG. 3 after the several adjacent channel droppings.

FIG. 8a depicts the distribution after some adjacent channels are dropped together. Upon the dropping, the average gain of the existing channels jumps to 17.4 dB. Implementing the control algorithm, the gain variation is again reduced after only a few iterations as depicted in FIG. 8b. The p-p gain variation is further reduced to 0.23 dB after 10 iterations, as depicted in FIG. 8c.

In another embodiment of the invention, the desired or target signal gain (or power) profile may not be flat. The method presented in the patent should still be effective to adjust pump power and/or wavelength to generate a signal gain (or power) profile approaching the pre-determined profile.

In another embodiment of the invention, the Raman pumps at each location can be adjusted individually and collectively such that the overall signal gain or power profile after a long distance transmission over many amplified fiber spans approaches the pre-determined profile effectively. This allows the elimination of the need of additional gain-equalization devices, such as EDFA based gain-equalization filter, and thus reduces system cost and improves transmission performance.

It is obvious to those skilled in the art that the reductions in p-p gain ripple and RMS gain variation allow for systems with longer spacing in-between amplifications. The lower noise values allow for longer spacing in between amplifications because the signal can travel farther before the accumulation of the noise and signal degradation become large enough to interfere with the signal quality.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method, comprising:

determining a signal gain profile of a Raman-pumped WDM system; and in response to a difference between said determined output gain profile and a desired output gain profile, adapting at least one Raman pump in a manner causing said difference to be reduced.

2. The method of claim 1, further comprising:

identifying those spectral regions within said determined signal gain profile associated with a difference between corresponding spectral regions within said desired signal gain profile, wherein those Raman pumps affecting said identified spectral regions are adapted.

3. The method of claim 1, wherein said desired output gain profile comprises one of a predetermined Raman gain profile and a flat broadband Raman gain profile.

4. The method of claim 1, wherein only a gain parameter of at least one Raman pump is adapted.

5. The method of claim 1, wherein only a wavelength parameter of at least one Raman pump is adapted.

6. The method of claim 1, wherein both a gain parameter and a wavelength parameter of at least one Raman pump is adapted.

7. The method of claim 1, wherein the amount by which a Raman pump is adapted is scaled to be within a predetermined range.

8. The method of claim 1, wherein said Raman-pumped WDM system comprises a plurality of amplified fiber spans, each of said amplified fiber spans being pumped by a respective at least one pump, said difference between said determined output gain profile and said desired output gain profile comprising an overall difference, said step of adjusting comprising adjusting at least one Raman pump at each of a plurality of amplifier stages.

9. The method of claim 8, further comprising the step of:

causing incremental adjustments to each of said plurality of amplifiers such that an overall gain adjustment is spread among said plurality of amplifiers.

10. The method of claim 1, wherein said step of adapting includes the step of determining the contribution of each of said at least one pump to said signal gain profile using the following equation:

$$G_{w\_avg}(p') = \frac{\int_{v_{s\_min}}^{v_{s\_max}} G(v_s) R(v_{p'} \to v_s) dv_s}{\int_{v_{s\_min}}^{v_{s\_max}} R(v_{p'} \to v_s) dv_s} =$$

$$\frac{\sum_{p=1}^{np} \left[ \overline{P_p} L \cdot \int_{v_{s\_min}}^{v_{s\_max}} R(v_{p'} \to v_s) R(v_p \to v_s) dv_s \right]}{\int_{v_{s\_min}}^{v_{s\_max}} R(v_{p'} \to v_s) dv_s}.$$

11. Apparatus for use in a wavelength-division-multiplexed (WDM) system, said apparatus comprising a memory for storing program instructions and a processor for executing said instructions to configure the apparatus to perform the steps of:

determining a signal gain profile of a Raman-pumped WDM system; and in response to a difference between said determined output gain profile and a desired output gain profile, adapting at least one Raman pump in a manner causing said difference to be reduced.

12. The apparatus of claim 11, wherein said step of adapting comprises the step of adjusting at least one of the pump power and pump wavelength of at least one pump.

13. The apparatus of claim 11, wherein said at least one pump is adapted according to a respective gain weighted average contributed to the signal gain profile.

14. The apparatus of claim 11, wherein said step of adapting comprises adjusting only one of the pump power and pump wavelength of said at least one pump.

15. The apparatus of claim 11, wherein said step of adapting comprises adjusting both the pump power and pump wavelength of said at least one pump.

16. The apparatus of claim 11, wherein said Raman-pumped WDM system comprises a plurality of amplified fiber spans, each of said amplified fiber spans being pumped by a respective at least one pump, said controller further performing the step of:

adapting at least one pump corresponding to each of a plurality of fiber spans.

17. The apparatus of claim 11, wherein the amount by which a Raman pump is adapted is scaled to be within a predetermined range.

18. The apparatus of claim 11, wherein said apparatus comprises a network element within said WDM system.

19. A Raman-pumped WDM system, comprising:

at least one amplifying fiber;

at least one Raman pump, for pumping said amplifying fiber; and at least one optical channel monitor, for measuring an output gain profile of said Raman-pumped WDM system; wherein at least one of said at least one Raman pumps is adapted in response to a difference between said measured output gain profile and a desired output gain profile such that said difference is reduced.

20. The system of claim 19, wherein said desired output gain profile comprises one of a predetermined Raman gain profile and a flat broadband Raman gain profile.

21. The system of claim 19, wherein only a gain parameter of at least one Raman pump is adapted.

22. The system of claim 19, wherein only a wavelength parameter of at least one Raman pump is adapted.

23. The system of claim 19, wherein both a gain parameter and a wavelength parameter of at least one Raman pump is adapted.

24. The system of claim 19, wherein the amount by which a Raman pump is adapted is scaled to be within a predetermined range.

* * * * *